US007142982B2

(12) United States Patent
Hickenlooper et al.

(10) Patent No.: US 7,142,982 B2
(45) Date of Patent: Nov. 28, 2006

(54) SYSTEM AND METHOD FOR DETERMINING RELATIVE DIFFERENTIAL POSITIONING SYSTEM MEASUREMENT SOLUTIONS

(75) Inventors: Harrison Thomas Hickenlooper, Palatka, FL (US); Mark Edward Kane, Orange Park, FL (US)

(73) Assignee: Quantum Engineering, Inc., Orange Park, FL (US)

( * ) Notice: Subject to any disclaimer, the term of this patent is extended or adjusted under 35 U.S.C. 154(b) by 270 days.

(21) Appl. No.: 10/938,820

(22) Filed: Sep. 13, 2004

(65) Prior Publication Data

US 2006/0058957 A1    Mar. 16, 2006

(51) Int. Cl.
*G01C 21/00*    (2006.01)
(52) U.S. Cl. .................. 701/213; 701/19; 701/209; 701/210; 701/301
(58) Field of Classification Search .................. 701/14, 701/19, 70, 20, 21, 22, 200–213, 300, 301; 246/14, 22 R, 72, 167 R, 125, 176, 177, 246/126, 182 R, 188; 702/159, 158; 340/902–904
See application file for complete search history.

(56) References Cited

U.S. PATENT DOCUMENTS

| 4,181,943 A | 1/1980 | Mercer, Sr. et al. |
|---|---|---|
| 4,306,694 A | 12/1981 | Kuhn |
| 4,459,668 A | 7/1984 | Inoue et al. |
| 4,561,057 A | 12/1985 | Haley, Jr. et al. |
| 4,711,418 A | 12/1987 | Aver, Jr. et al. |
| 4,728,063 A | 3/1988 | Petit et al. |
| 4,886,226 A | 12/1989 | Frielinghaus |
| 5,072,900 A | 12/1991 | Malon |
| 5,129,605 A | 7/1992 | Burns et al. |
| 5,145,131 A | 9/1992 | Franke |
| 5,177,685 A | 1/1993 | Davis et al. |
| 5,332,180 A | 7/1994 | Peterson et al. |
| 5,340,062 A | 8/1994 | Heggestad |
| 5,364,047 A | 11/1994 | Petit et al. |
| 5,394,333 A | 2/1995 | Kao |
| 5,398,894 A | 3/1995 | Pascoe |
| 5,452,870 A | 9/1995 | Heggestad |
| 5,470,034 A | 11/1995 | Reeves |
| 5,533,695 A | 7/1996 | Heggestad et al. |
| 5,620,155 A | 4/1997 | Michalek |
| 5,699,986 A | 12/1997 | Welk |
| 5,740,547 A | 4/1998 | Kull et al. |
| 5,743,495 A | 4/1998 | Welles, II et al. |

(Continued)

OTHER PUBLICATIONS

Lundsten, Carsten S., "Railroad Rules, Signalling, Operations: Track Warrant Control", Nov. 7, 1998.

(Continued)

*Primary Examiner*—Richard M. Camby
(74) *Attorney, Agent, or Firm*—DLA Piper US LLP

(57) ABSTRACT

A method and system in which a vehicle carries an on-board positioning system and has access to a database of information pertaining to a plurality of fixed paths. A vector between the position of the fixed path and a position of the vehicle as reported by the positioning system is calculated prior to arriving at a point of divergence (i.e., a point at which a path branches, such as a switch on a railroad track). After passing the path divergence, a second vector is calculated between the position of the vehicle as reported by the positioning system and at least one of the alternate paths, preferably the correct alternate path. The first vector is compared to the second vector, and a determination as to which path the vehicle is on is made based on the comparison.

22 Claims, 9 Drawing Sheets

U.S. PATENT DOCUMENTS

| | | | |
|---|---|---|---|
| 5,751,569 | A | 5/1998 | Metel et al. |
| 5,803,411 | A | 9/1998 | Ackerman et al. |
| 5,828,336 | A | 10/1998 | Yunck et al. |
| 5,828,979 | A | 10/1998 | Polivka et al. |
| 5,867,122 | A | 2/1999 | Zahm et al. |
| 5,944,768 | A | 8/1999 | Ito et al. |
| 5,950,966 | A | 9/1999 | Hungate et al. |
| 5,978,718 | A | 11/1999 | Kull |
| 5,995,881 | A | 11/1999 | Kull |
| 6,049,745 | A | 4/2000 | Douglas et al. |
| 6,081,769 | A | 6/2000 | Curtis |
| 6,102,340 | A | 8/2000 | Peek et al. |
| 6,112,142 | A | 8/2000 | Shockley et al. |
| 6,135,396 | A | 10/2000 | Whitfield et al. |
| 6,179,252 | B1 | 1/2001 | Roop et al. |
| 6,218,961 | B1 | 4/2001 | Gross et al. |
| 6,311,109 | B1 | 10/2001 | Hawthorne et al. |
| 6,322,025 | B1 | 11/2001 | Colbert et al. |
| 6,345,233 | B1 | 2/2002 | Erick |
| 6,371,416 | B1 | 4/2002 | Hawthorne |
| 6,373,403 | B1 | 4/2002 | Korver et al. |
| 6,374,184 | B1 | 4/2002 | Zahm et al. |
| 6,377,877 | B1 | 4/2002 | Doner |
| 6,397,147 | B1 | 5/2002 | Whitehead |
| 6,421,587 | B1 | 7/2002 | Diana et al. |
| 6,456,937 | B1 | 9/2002 | Doner et al. |
| 6,459,964 | B1 | 10/2002 | Vu et al. |
| 6,459,965 | B1 | 10/2002 | Polivka et al. |
| 6,487,478 | B1 | 11/2002 | Azzaro et al. |
| 6,609,049 | B1 | 8/2003 | Kane et al. |
| 6,701,228 | B1 | 3/2004 | Kane et al. |
| 6,824,110 | B1 | 11/2004 | Kane et al. |
| 6,853,888 | B1 | 2/2005 | Kane et al. |
| 6,854,953 | B1 | 2/2005 | Van Drentham-Susman et al. |
| 6,863,246 | B1 | 3/2005 | Kane et al. |
| 7,079,926 | B1 * | 7/2006 | Kane et al. .......... 701/19 |
| 7,092,800 | B1 * | 8/2006 | Kane et al. .......... 701/19 |
| 2001/0056544 | A1 | 12/2001 | Walker |
| 2002/0070879 | A1 | 6/2002 | Gazit et al. |
| 2002/0096605 | A1 | 7/2002 | Berry et al. |
| 2003/0117333 | A1 | 6/2003 | McLean |
| 2003/0225490 | A1 | 12/2003 | Kane et al. |
| 2004/0006411 | A1 | 1/2004 | Kane et al. |
| 2004/0006413 | A1 | 1/2004 | Kane et al. |
| 2004/0073342 | A1 | 4/2004 | Kane et al. |
| 2004/0102877 | A1 | 5/2004 | Kane et al. |
| 2004/0181320 | A1 | 9/2004 | Kane et al. |
| 2004/0236482 | A1 | 11/2004 | Kane et al. |
| 2005/0004722 | A1 | 1/2005 | Kane et al. |

OTHER PUBLICATIONS

"System Architecture, ATCS Specification 100", May 1995.
"A New World for Communications & Signaling", Progressive Railroading, May 1986.
"Advanced Train Control Gain Momentum", Progressive Railroading, Mar. 1986.
"Railroads Take High Tech in Stride", Progressive Railroading, May 1985.
Moody, Howard G, "Advanced Train Control Systems A System to Manage Railroad Operations", Railway Fuel and Operating Officers Association, Annual Proceedings, 1993.
Reugg, G.A., "Advanced Train Control Systems ATCS", Railway Fuel and Operating Officers Association, Annual Proceedings, 1986.
Malone, Frank, "The Gaps Start to Close"Progressive Railroading, May 1987.
"On the Threshold of ATCS", Progressive Railroading, Dec. 1987.
"CP Advances in Train Control", Progressive Railroading, Sep. 1987.
"Communications/Signaling: Vital for dramatic railroad advances", Progressive Railroading, May 1988.
"ATCS's System Engineer", Progressive Railroading, Jul. 1988.
"$C^3$ Comes to the Railroads", Progressive Railroading, Sep. 1989.
"The Electronic Railroad Emerges", Progressive Railroading, May 1989.
"ATCS on Verge of Implementation", Progressive Railroading, Dec. 1989.
"ATCS Evolving on Railroads", Progressive Railroading, Dec. 1992.
"High Tech Advances Keep Railroads Rolling", Progressive Railroading, May 1994.
"FRA Promotes Technology to Avoid Train-To-Train Collisions", Progressive Railroading, Aug. 1994.
"ATCS Moving slowly but Steadily from Lab for Field", Progressive Railroading, Dec. 1994.
Judge, T., "Electronic Advances Keeping Railroads Rolling", Progressive Railroading, Jun. 1995.
"Electronic Advances Improve How Railroads Manage", Progressive Railroading, Dec. 1995.
Judge, T., "BNSF/UP PTS Pilot Advances in Northwest", Progressive Railroading, May 1996.
Foran, P., "Train Control Quandary, Is CBTC viable? Railroads, Suppliers Hope Pilot Projects Provide Clues", Progressive Railroading, Jun. 1997.
"PTS Would've Prevented Silver Spring Crash: NTSB", Progressive Railroading, Jul. 1997.
Foran, P., "A 'Positive' Answer to the Interoperability Call", Progressive Railroading, Sep. 1997.
Foran, P., "How Safe is Safe Enough?", Progressive Railroading, Oct. 1997.
Foran, P., "A Controlling Interest In Interoperability", Progressive Railroading, Apr. 1998.
Derocher, Robert J., "Transit Projects Setting Pace for Train Control", Progressive Railroading, Jun. 1998.
Kube, K., "Variations on a Theme", Progressive Railroading, Dec. 2001.
Kube, K., "Innovation in Inches", Progressive Railroading, Feb. 2002.
Vantuono, W., "New York Leads a Revolution", Railway Age, Sep. 1996.
Vantuono, W., "Do you know where your train is?", Railway Age, Feb. 1996.
Gallamore, R., "The Curtain Rises on the Next Generation", Railway Age, Jul. 1998.
Burke, J., "How R&D Is Shaping the 21st Century Railroad", Railway Age, Aug. 1998.
Vantunono, W., "CBTC: A Maturing Technology", Third International Conference On Communications Based Train Control, Railway Age, Jun. 1999.
Sullivan, T., "PTC—Is FRA Pushing Too Hard?", Railway Age, Aug. 1999.
Sullivan, T., "PCT: A Maturing Technology", Railway Age, Apr. 2000.
Moore, W., "How CBTC Can Increase Capacity", Railway Age, Apr. 2001.
Vantuono, W., "CBTC: The Jury is Still Out", Railway Age, Jun. 2001.
Vantuono, W., "New-tech Train Control Takes Off", Railway Age, May 2002.
Union Switch & Signal Intermittent Cab Signal, Bulletin 53, 1998.
GE Harris Product Sheet: "Advanced Systems for Optimizing Rail Performance" and "Advanced Products for Optimizing train Performance", undated.
GE Harris Product Sheet: "Advanced, Satellite-Based Warning System Enhances Operating Safety", undated.
Furman, E., et al., "Keeping Track of RF", GPS World, Feb. 2001.

* cited by examiner

SYSTEM AND METHOD FOR DETERMINING RELATIVE DIFFERENTIAL POSITIONING SYSTEM MEASUREMENT SOLUTIONS

BACKGROUND OF THE INVENTION

1. Field of the Invention

The present invention relates generally to positioning systems, and more particularly to methods for using such systems to determine relative differential positioning for transportation applications.

2. Related Art

As is well known in the relevant art(s), the Department of Defense's Global Positioning Satellite (GPS) constellation operationally consists of twenty-four satellites that provide global coverage for determining the geographic position of a user equipped with any of a variety of commercially-available receivers. GPS receivers are capable of receiving the L-band radio signals emitted from the satellites in the constellation whose orbits have an altitude of approximately 12,660 miles above the Earth. For any given signal reading, at least four satellites are required to compute the three dimensions of position (X, Y, and Z or latitude, longitude and altitude, respectively) and time.

More specifically, GPS receivers receive transmissions of at least four satellites and combine the information with information in an electronic almanac, so that it can mathematically determine the receiver's position on Earth in a well-known manner. The basic information a GPS receiver provides is the latitude, longitude and altitude, or some similar measurement, of its current position. Most receivers then combine this data with other information, such as maps, to make the receiver more useable (i.e., more "user friendly").

Aside from the recreational uses that automobile drivers, boaters, hikers, etc. can make of GPS receivers (an aside from GPS' military applications), there a several large-scale, commercial uses of GPS receiver systems.

For example, the pressure to increase the performance of modern rail (i.e., train) systems, in terms of speed, reliability and safety, has led to many proposals to automate various aspects of train operation. Controlling the movement of trains in a modern environment both in a train yard and on main train lines is a complex process. Collisions with other trains must be avoided and regulations in areas such as grade crossings must be complied with.

Trains or a maintenance crews must be coordinated by a dispatcher to occupy a portion of main line track between named locations (e.g., mile markers, switches, stations, or other points). In addition to specifying certain track sections, dispatchers must be able to coordinate trains and crews with respect to specifying speed limits, direction, time limits, and whether to clear the main line (e.g., by entering a secondary track such as a siding) and/or any other section of track (sidings, yards secondary track, etc.). Any errors in this process can lead to disastrous consequences.

Attempts to automate the above-described track coordination system include Centralized Traffic Control (CTC) systems which allow a dispatcher to control movement of trains by controlling track switches and wayside signals from a central dispatch office. More advanced systems include Automatic Train Control (ATC) systems where train location, speed and train control information are continually exchanged between a train cab and computerized wayside controllers in real time (in some systems, often referred to as cab signal systems, track rails are used to carry this information). The more advanced versions of CTC and ATC systems often employ GPS technology for accurate positioning information for speed, reliability and safety reasons.

Given the foregoing, one can conclude that the accuracy of any particular standalone GPS receiver (e.g., located on a train car), or collection of GPS receivers (e.g., several receivers working as part of a CTC or ATC system) is of concern. Any given GPS receiver can have an accuracy (i.e., can have errors in their positioning determination) ranging from 10 to 100 meters. The accuracy of a GPS receiver is affected by several different factors that can be categorized as either "natural" or "military."

As for the natural category of errors, the position information provided by a GPS receiver is derived from determining the amount of time a signal takes to travel from the satellite to the receiver. This measurement is made possible by placing clocks in each of the satellites and the receivers. Errors in either the satellites' clocks or the receiver's clock alter this determination. Lack of stability or synchronicity among the clocks will result in an inaccurate measurement of signal travel time. When this is multiplied by the speed of electromagnetic radiation (i.e., the emitted L-band signal), an error in the apparent distance, will result.

A second natural source of error is in the value representing the propagation speed of electromagnetic radiation (i.e., the L-band radio signal). While the propagation speed of electromagnetic radiation is constant in a vacuum, it is retarded by passage through matter such as air in the atmosphere. The amount of speed alteration (i.e., delay) caused by the atmosphere will depend on the thickness of the air layer traversed, temperature, and a variety of other atmospheric conditions.

Apart from the "natural" category of errors in pseudorange determination and in determination of precise satellite positions, GPS also contains the capability to produce purposeful errors—known as selective availability ("SA")—which can be introduced by the U.S. military. That is, in order to prevent the precision of GPS positioning from being used by the wrong persons, the military has the capability to introduce purposeful random errors into the clock signal broadcast by the GPS satellites. This has the effect of further degrading the accuracy of the pseudorange determinations and, hence, the accuracy of the coordinates determined for the GPS receiver.

A more detailed discussion of both the so-called "natural" and "military" categories of errors affecting the accuracy of GPS receivers can be found in U.S. Pat. No. 5,828,336 issued to Yunck, et al. which is incorporated herein by reference in its entirety.

A known method of improving the accuracy of a (standalone) GPS receiver's position determinations in spite of the above-mentioned category of errors is known as Differential GPS (DGPS). In this technique, one or more additional known locations are added to the GPS determination. Essentially, one or more ground stations in the general vicinity of a moving GPS receiver simultaneously receive the GPS signals and determine their own positions. Because the ground stations are stationary, any change in their determined position must be due to GPS error, either natural or military. The delta value between the ground station's true position and the position recently determined by GPS is broadcast so that mobile GPS receivers in the vicinity of the relevant ground station can use this correction to improve their own positioning solution.

Because mobile receivers in the vicinity of the ground station are receiving the same GPS satellites through essentially the same part of the atmosphere and at the same instant as the known ground station, these differential corrections are quite effective at overcoming the effects of the above-mentioned two categories of errors. Because the mobile GPS receiver is not at exactly the same coordinates as the ground station and the true programmed position of the ground station may not be perfect, however, the correction achieved by DGPS-type techniques is consequently not perfect as well. In addition, the DGPS receivers are more complex, and therefore more expensive, than ordinary GPS receivers.

In the transportation industry, it is important to know which path a vehicle has taken from among a plurality of possible fixed paths. In particular, in the railroad industry, it is important to know whether a train is on the correct track after passing a switch. If the switch is set at an incorrect position and the train has taken the wrong track, a collision may result. Ideally, track switches are set at the correct position so that a train will take the correct track and, in the event the switch is not correctly set, a train operator will stop the train before or shortly after passing the switch. However, human beings are imperfect and prone to mistakes. Thus, it would be desirable to have a system that can automatically determine whether a correct path has been taken. However, in many situations, alternate paths are often separated by a distance less than the accuracy of a GPS system receiver and are therefore not spaced far enough apart to permit an unambiguous determination as to which of two or more alternate paths have been taken by a vehicle.

Therefore, what is needed is a system, method and apparatus for determining whether a vehicle has taken a correct path when alternate paths are separated by a distance less than the accuracy of a positioning system receiver.

SUMMARY OF THE INVENTION

The present invention addresses the above-discussed issues to a great extent by proving a method and system in which a vehicle carries an on-board positioning system and has access to a database of information pertaining to a plurality of fixed paths. Preferably, the positioning system is a global positioning system receiver and the database comprises coordinates for a plurality of points corresponding to the plurality of fixed paths. In the method, a vector between the position of the fixed path and a position of the vehicle as reported by the positioning system is calculated prior to arriving at a point of divergence (i.e., a point at which a path branches, such as a switch on a railroad track or a fork in a road). After passing the path divergence, a second vector is calculated between the position of the vehicle as reported by the positioning system and at least one of the alternate paths, preferably the "correct" alternate path (the path the vehicle should have taken). The first vector is compared to the second vector, and a determination as to which path the vehicle is on is made based on the comparison.

If the comparison indicates that the first and second vectors are close, the vehicle is on the alternate path corresponding to the second vector. If the difference between the vectors is significantly large, then second vectors between the vehicle's current position as reported by the GPS system and the alternative paths are calculated and the second vector that most closely matches the first vector indicates which of alternate paths the vehicle has taken.

In preferred embodiments, the vectors represent the direction and distance between the position reported by the positioning system and the nearest point on the fixed path. In some of these embodiments, the vector is calculated forming a first line between the point in the database that has most recently been passed by the vehicle and the next point in the database that will be passed by the vehicle, and calculating a distance between this first line and the vehicle's location as reported by the GPS system along a second line normal to the first line.

DESCRIPTION OF THE FIGURES

The features and advantages of the present invention will become more apparent from the detailed description set forth below when taken in conjunction with the drawings in which like reference numbers indicate identical or functionally similar elements.

DETAILED DESCRIPTION

The present invention will be discussed with reference to preferred embodiments of vehicle control systems. Specific details, such as accuracies of GPS receivers, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

The present invention provides a system and method for determining relative differential global positioning ("RDGPS") system measurement solutions. The invention is particularly useful in determining which path from among a plurality of available paths a vehicle has taken. The invention has particular application in the transportation field. More specifically, train control system (e.g., CTC systems, ATC systems and the like) may employ the present invention to quickly and accurately determine, for example, when a train has changed tracks. That is, the present invention is useful in determining whether the positional setting of track switches are proper and whether trains (intentionally or accidentally) have changed or stayed course upon passing a track switch. The invention is also applicable to cars, trucks and other vehicles traveling on fixed paths such as public roads.

The present invention is now described in more detail herein in terms of the above examples. This is for convenience only and is not intended to limit the application of the present invention. In fact, after reading the following description, it will be apparent to one skilled in the relevant art(s) how to implement the following invention in alternative embodiments (e.g., using an external global navigation system other than the GPS system, nautical and other commercial applications other than those for train/rail transportation systems, recreational applications, etc.).

Figure 1:
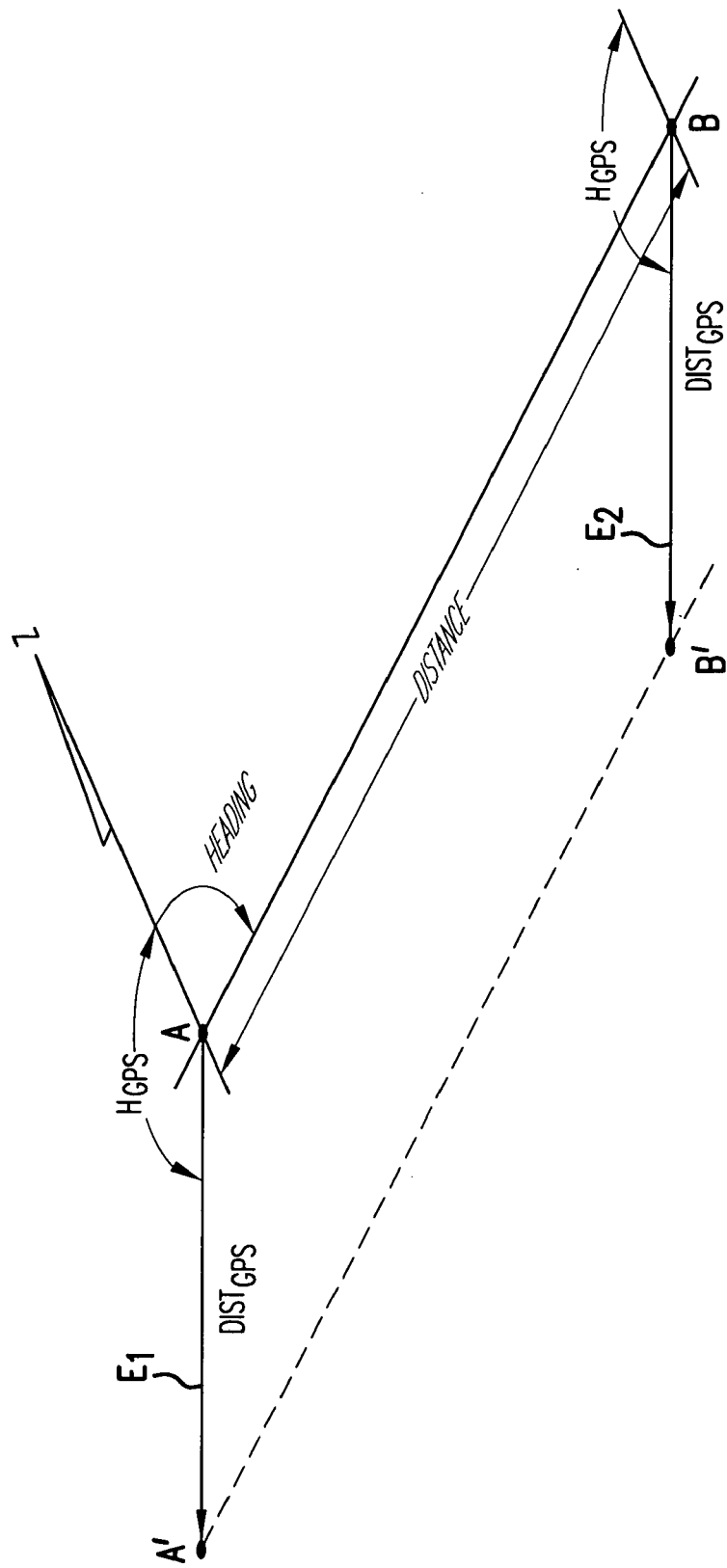
FIG. 1 is a vector diagram illustrating actual positions, positions reported by a typical GPS receiver, and error vectors associated therewith.

As mentioned above, GPS receivers, even DGPS receivers, exhibit an error. This error is not constant. However, it does change slowly. Therefore, if position measurements are taken using a GPS receiver over a short period of time (e.g., a minute or two), the error in these signals will be almost constant. This allows highly accurate determinations of differential movement to be made. For example, referring now to FIG. 1, assume a vehicle is actually at point A. A GPS receiver mounted in the vehicle calculates the position as A'. The difference between the actual position and the position by the calculated by the GPS receiver is represented by error vector $E_1$. Now assume that the vehicle moves from point A to point B in approximately one minute. The GPS receiver will calculate a position of B', which will differ from the actual position B by the error vector $E_2$, which is nearly identical to the first error vector $E_1$. By taking the difference between A' and B', the actual distance traveled by the vehicle can be determined with a degree of accuracy that is much greater than the accuracy of the position reports A' and B'. In other words, the relative movement of the vehicle between positions A and B can be determined much more accurately than the absolute position of the vehicle. This is because the precision of the GPS receiver is better than its accuracy.

Figure 2:
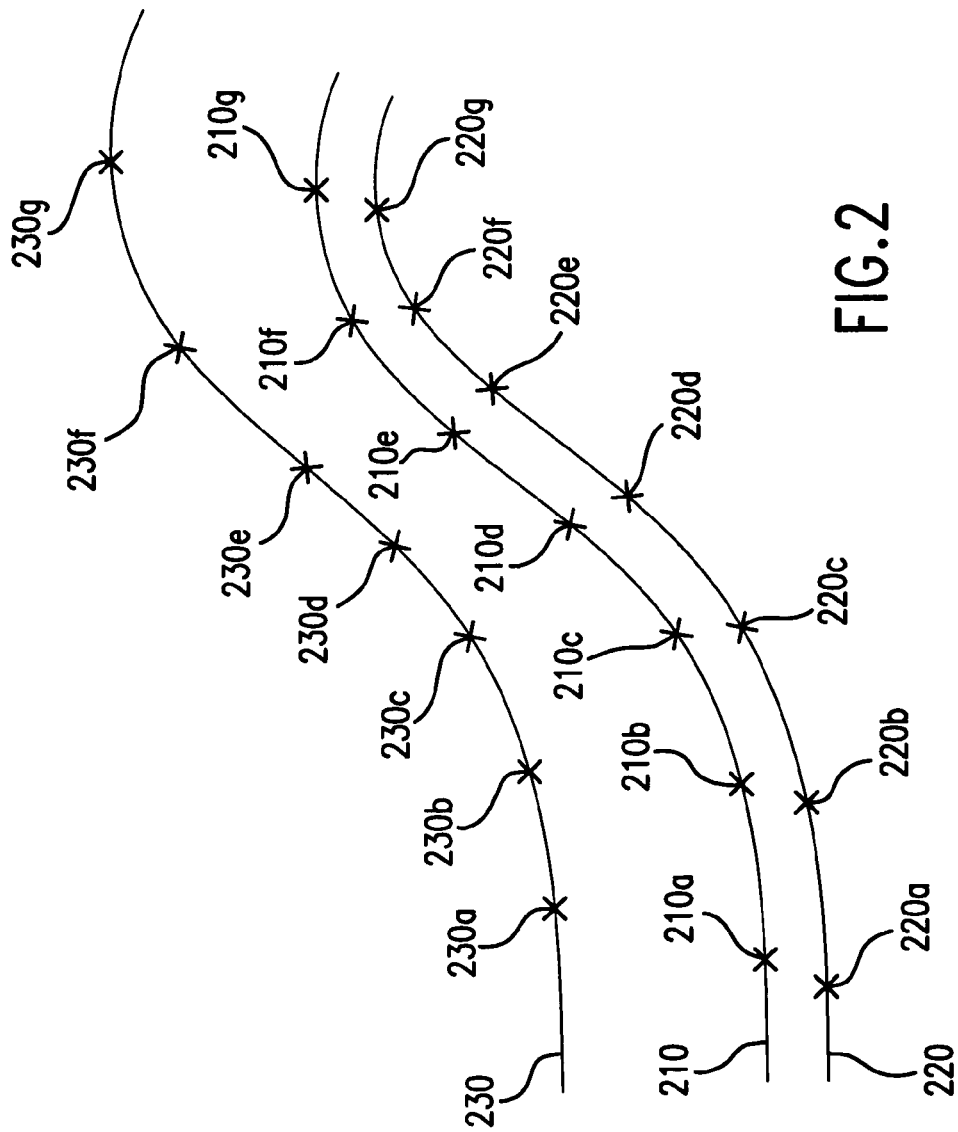
FIG. 2 is schematic diagram illustrating an actual railroad track and corresponding tracks indicated by position reports by a typical GPS receiver.

A consequence of this slowly changing error vector can be seen with reference to FIG. 2, which illustrates an actual railroad track 210 and a plurality of points 210a–g on the track 210. The points 21a–g are illustrative of points that might appear in a track database, which will be discussed in further detail below. When a train travels over the track 210, a GPS system onboard the train may produce position reports such as those illustrated by points 220a–g. As illustrated by curve 220, the points 220a–g are offset by a nearly constant error from the corresponding points 210a–g on the track 210 such that a nearly parallel path 220 is formed. Similarly, at a later time, a GPS receiver on a train traveling along the track 210 may provide a plurality of points 230a–g offset by a different error vector. However, although the error vector for the second time is different from that of the first time, the second set of points also trace a path 230 that is nearly parallel to the track 210.

Figure 3:
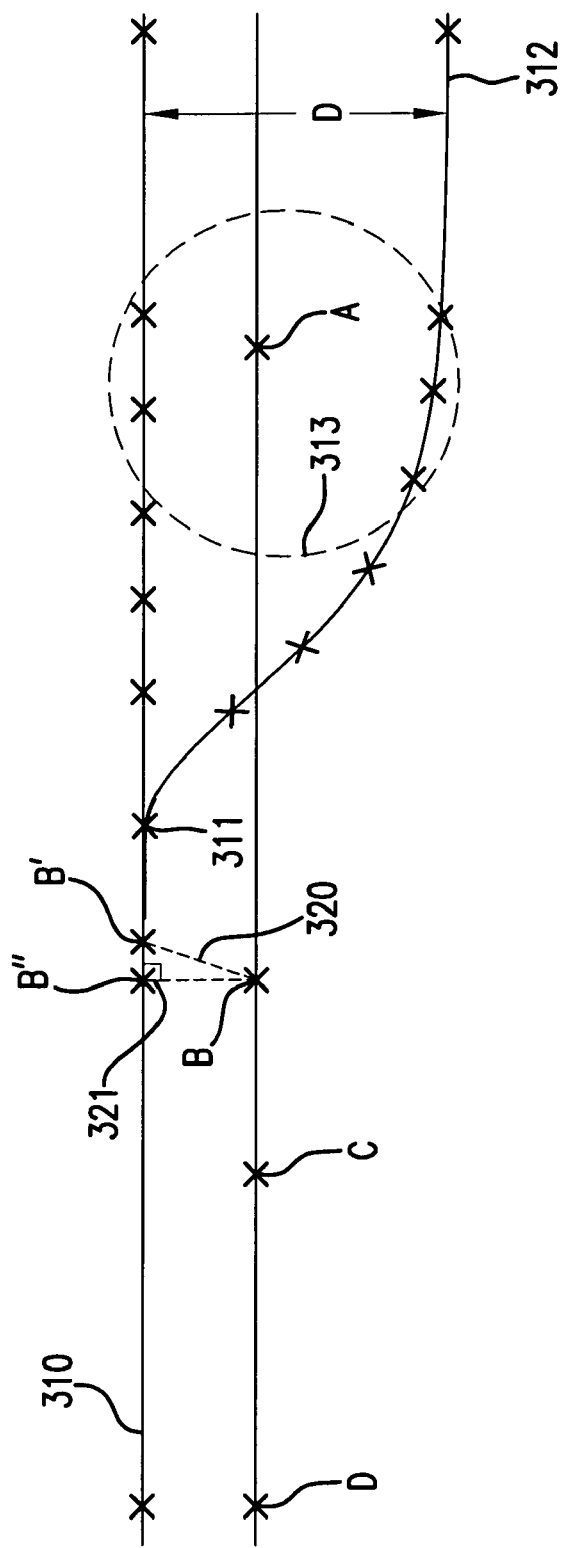
FIG. 3 is a schematic diagram illustrating a railroad rack including a switch and siding and position reports indicated by a typical GPS receiver.

A possible scenario involving a switch is illustrated in FIG. 3, in which a main line track 310 includes a switch 311 that switches between the main line track 310 and a siding 312. If the distance D between the main line 310 and the siding 312 is large compared to the accuracy of the GPS receiver, then it is possible to determine whether a train has remained on the main line or been diverted onto the siding by the switch 311 by simply calculating the distances between the position reported by the GPS receiver and the main line 310 and siding 312 and determining which of the two is closest to the position reported by the GPS receiver.

On the other hand, if the potential error in the GPS is large compared to the distance D, it may not be possible to determine whether the train is on the main line 310 or the siding 312. For example, if the potential error of the GPS receiver is represented by the circle 313 around point A, then it is possible that point A could be reported by a GPS receiver on either the main line 310 or the siding 312 as both are within the circle 313. Thus, a position report from the GPS receiver at point A cannot be used to determine whether the train is on the main line 310 or the siding 312.

However, if one or more position reports from the GPS receiver are obtained prior to the switch 311, then it will be possible to determine whether the train is on the main line or the siding using the same GPS receiver. This can be done using the method illustrated in the flowchart 400 of FIG. 4. The first step 410 is to determine the GPS path error, which is the vector between the position of the vehicle as reported by the GPS receiver and the nearest point on the path, at step 410. It should be noted that the GPS path error is not necessarily the same as the error in the GPS receiver. For example, with reference to FIG. 3, a GPS receiver may report that a train is at point B when it is really at point B'. The error in the GPS receiver is the vector between the reported position B and the actual position B' (error vector 320). In contrast, the GPS path error is the vector between the reported position B and the nearest point on the path along a line normal to the path, B" (error vector 321), which is smaller than the GPS error 320.

Figure 4:
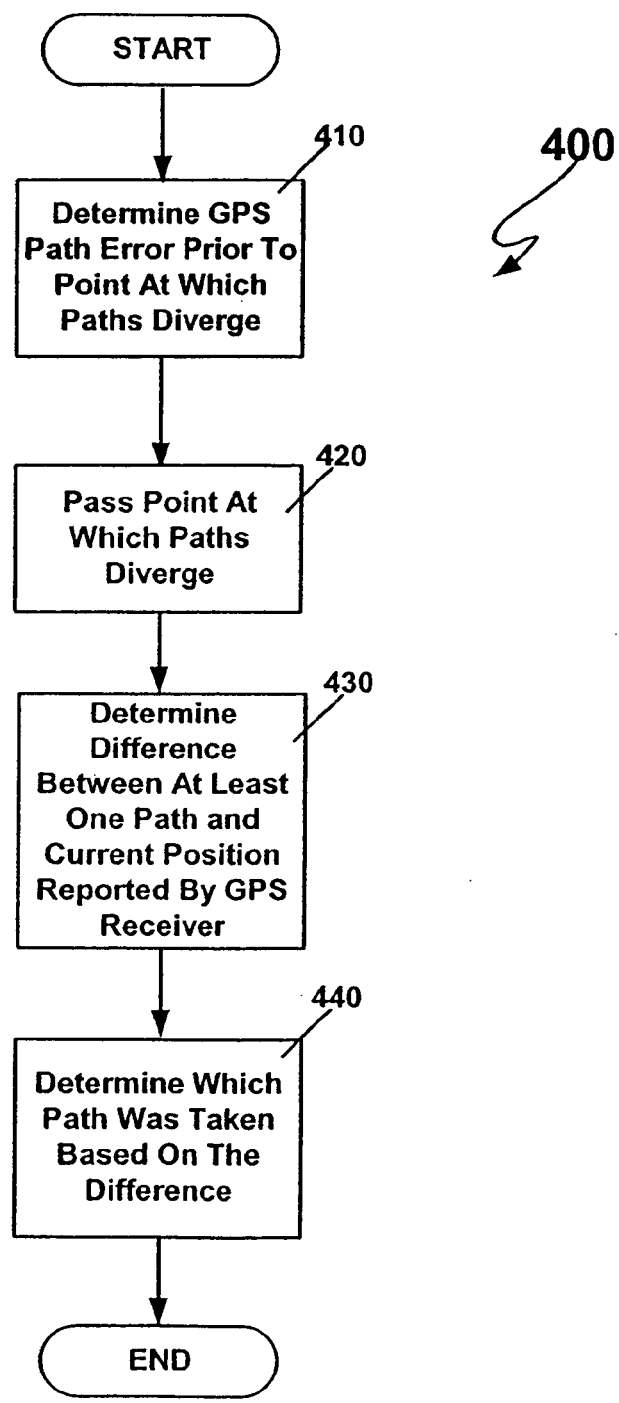
FIG. 4 is a flowchart of a method for determining which of a plurality of alternative paths a vehicle has taken according to an embodiment of the invention.

Referring now back to FIG. 4, after the GPS path error is determined at step 410, the vehicle passes the point at which the paths diverge at step 420. Next, at step 430, the vector between the current position of the vehicle as reported by the GPS receiver and at least one path is reported at step 430 and a determination as to which path the vehicle has taken is made based on the vector at step 440.

The number of paths for which vectors must be calculated depends upon the circumstances and is not the same for all embodiments. In situations in which the path diverges into only two branches, some embodiments of the invention determine the vector for only a single path. If the vector matches (within some tolerance) the previously determined GPS path error, the vehicle is on the branch of the path for which the vector was calculated—otherwise, the vehicle is on the other branch of the path. Other embodiments of the invention calculate the vector for both branches and choose the path for which the vector most closely matches the GPS path error. When the path diverges into three or more branches, some of the embodiments calculate the vector between pre- and post-divergence GPS path errors one branch at a time, stopping when one of the GPS path errors is within some predetermined delta. Other embodiments calculate GPS path errors for all of the paths, and select the one that most closely matches the pre-divergence GPS path error.

Figure 5:
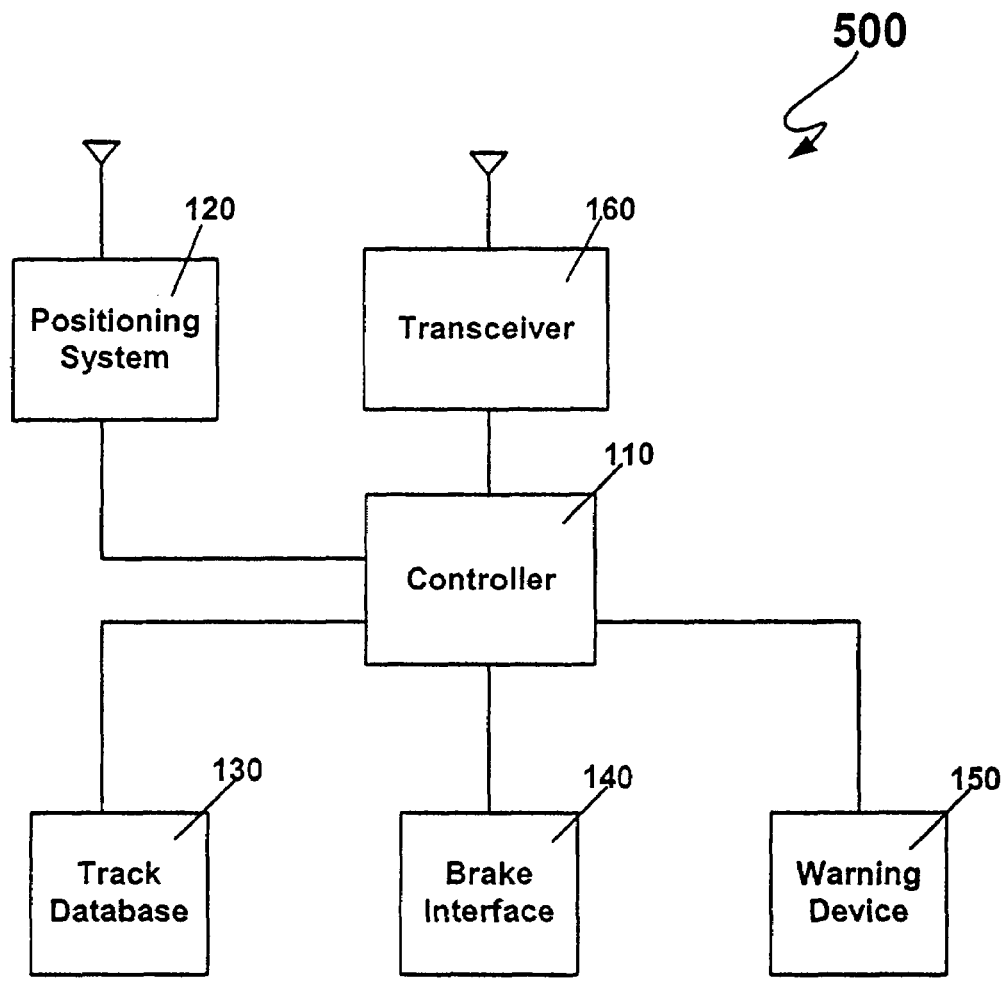
FIG. 5 is a block diagram of a train control system that is capable of determining which of a plurality of alternative paths a vehicle has taken according to an embodiment of the invention.

A train control system 500 suitable for determining which of a plurality of paths a train has taken is illustrated in FIG. 5. The system 500 includes a controller 110. The controller 110 may comprise a microprocessor or may be implemented using discrete components. The controller 110 also includes associated memory. The controller 110 is responsible for implementing the logical operations discussed in further detail below.

A positioning system 120 is connected to the controller 110. As used herein, the term "positioning system" refers to the portion of a positioning system that is commonly located on a mobile vehicle, which may or may not comprise the entire system. Thus, for example, in connection with a global positioning system, the term "positioning system" as used herein refers to a GPS receiver and does not include the satellites that are used to transmit information to the GPS receiver. The invention is believed to be particularly applicable to GPS receivers and therefore will be discussed primarily in that context herein. However, the invention is not so limited and can be used with any type of positioning system that has better precision than accuracy. The GPS receiver 120 can be of any type, including a differential GPS, or DGPS, receiver. The GPS receiver 120 supplies the controller 110 with position information for the train on which the system 500 is installed. By using train position information obtained from the positioning system 120 as an index into a track database 130 (discussed in further detail below), the controller 110 can determine the train's position relative to switches on the railroad.

A track database 130 is also connected to the controller 110. The track database 140 preferably comprises a non-volatile memory such as a hard disk, flash memory, CD-ROM or other storage device, on which track data and the locations of wayside signal devices is stored. In preferred embodiments, the track data comprises coordinates for a plurality of points corresponding to different locations on the track in a manner well known in the art. The points are not necessarily uniformly spaced. In some embodiments, the points are more closely spaced where the track is curved and less closely spaced where the track is straight. Other types of memory, including volatile memory, may also be used. The track data also includes positions of switches and other points of interest such as grade crossings, stations, etc. The track database 130 also includes information concerning the direction and grade of the track in some embodiments. The track database 130 further includes information as to the route that the train is supposed to follow in some embodiments (in other embodiments, the route information is stored in the memory associated with the controller 110).

A brake interface 140 connected to the controller 110 allows the controller 110 to activate and control the train brakes when necessary to slow and/or stop the train, such as when the system 500 determines that an incorrect path has been taken. Brake interfaces are well known in the art and will not be discussed in further detail herein.

Some embodiments of the invention include a warning device 150 connected to the controller 110. The warning device 150 may be a part of an operator's pendant or may be a light or an audible device such as a bell or horn.

Some embodiments of the invention also include a transceiver 160 by which the train on which the system 500 is installed can communicate with a dispatcher (not shown in FIG. 5). The dispatcher may provide the train with movement authorities, temporary speed restrictions, and, in some embodiments, route information (in other embodiments, the route information may be entered manually by the operator on an input device (not shown in FIG. 5) associated with the controller 110).

Figure 6A:
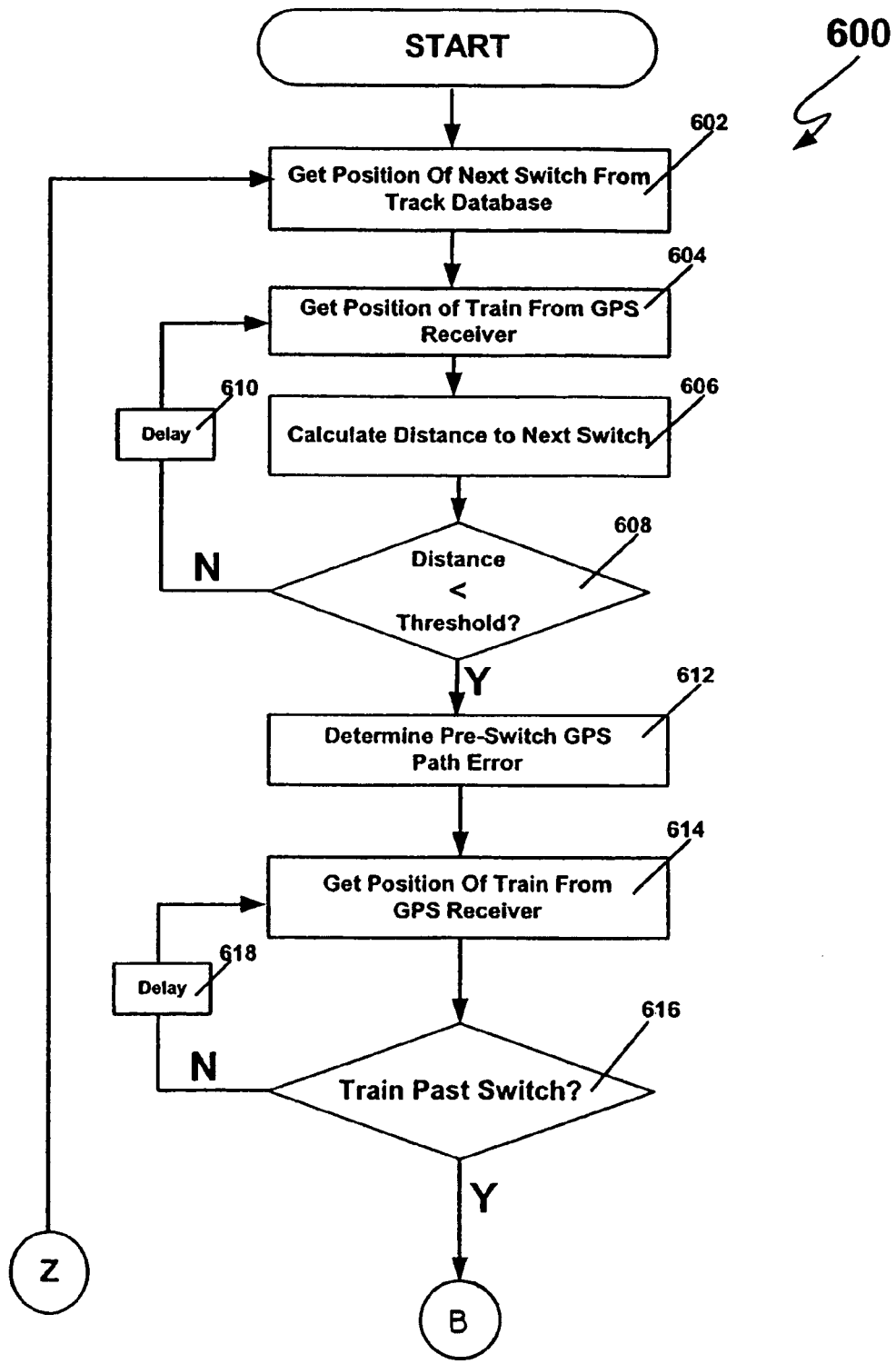
FIGS. 6a–d are flowcharts illustrating the processing performed by the train control system of FIG. 5 in various alternative embodiments of the invention.

The operations performed by the system 500 in some embodiments of the invention are illustrated in the flowchart 600 of FIG. 6a–d. Referring now to FIG. 6a, the controller 110 gets the position of the next switch from the track database 130 at step 602. The controller 110 then gets the position of the train from the GPS receiver 120 at step 604 and calculates the distance to the next switch at step 606. If the distance is less than a threshold at step 608, the controller 110 delays at step 610 and repeats steps 602 et seq.

If the difference is less than the threshold at step 608, the controller 110 determines the pre-switch GPS path error at step 612. As discussed above, the GPS path error is the vector between the train's position as reported by the GPS receiver 120 and the nearest point on the train track. Where the track database 130 stores coordinates of points on the train track, the nearest point on the train track will most likely not be a point for which coordinates are stored in the track database 130. In this situation, the coordinates in the track database for the closest point that has been passed by the train on its current trip and the closest point that has not yet been passed by the train are used to form a line. The GPS path error is then determined by calculating a vector between this first line and the vehicle's location as reported by the GPS system along a second line normal to the first line.

After the GPS path error is determined at step 612, the controller 110 gets the current train position from the GPS receiver 120 at step 614 and checks whether the train has traveled a distance past the switch sufficient to allow a path determination to be made at step 616. The distance by which the train must past the switch must be large enough so that the tracks diverge by a significant amount, but should be as small as possible so that the taking of an incorrect path can be detected as soon as possible. The actual distance depends upon the application.

Figure 6B:
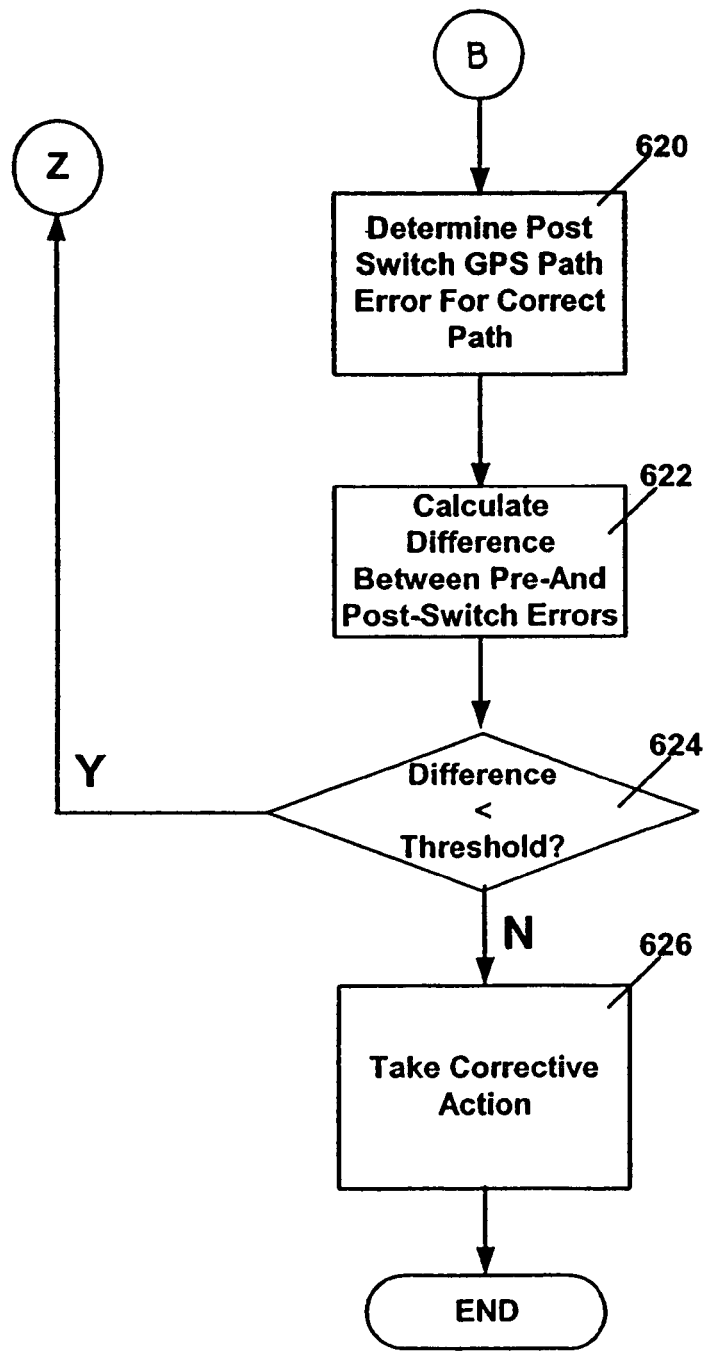

Referring now to FIG. 6b, the controller 110 determines the GPS path error for the "correct" path (the path on which the train is supposed to travel) at step 620, and calculates the difference between this post-switch GPS error and the GPS error calculated prior to arriving at the switch at step 622. If this difference is less than a predetermined threshold (i.e., the pre- and post-switch GPS errors are approximately the same) at step 624, then the train is on the correct track and steps 602 et seq. are repeated.

If, however, the difference between the pre- and post-switch GPS errors exceeds the threshold at step 624, indicating that the train has taken the wrong path because the switch was not set correctly, corrective action is taken at step 626. This corrective action may take a variety of forms. In some embodiments, the controller 110 immediately activates the train's brakes via brake interface 140. In other embodiments, the controller activates the warning device 150 to give the operator the opportunity to take action. In these embodiments, the controller 110 may automatically activate the brakes to stop the train if the operator does not acknowledge the warning device 140 and/or activate the brakes to stop or slow the train within some predetermined time period. Yet other corrective actions may also be taken by the controller 110 in the event that it is determined that the train has taken the wrong path.

Figure 6C:
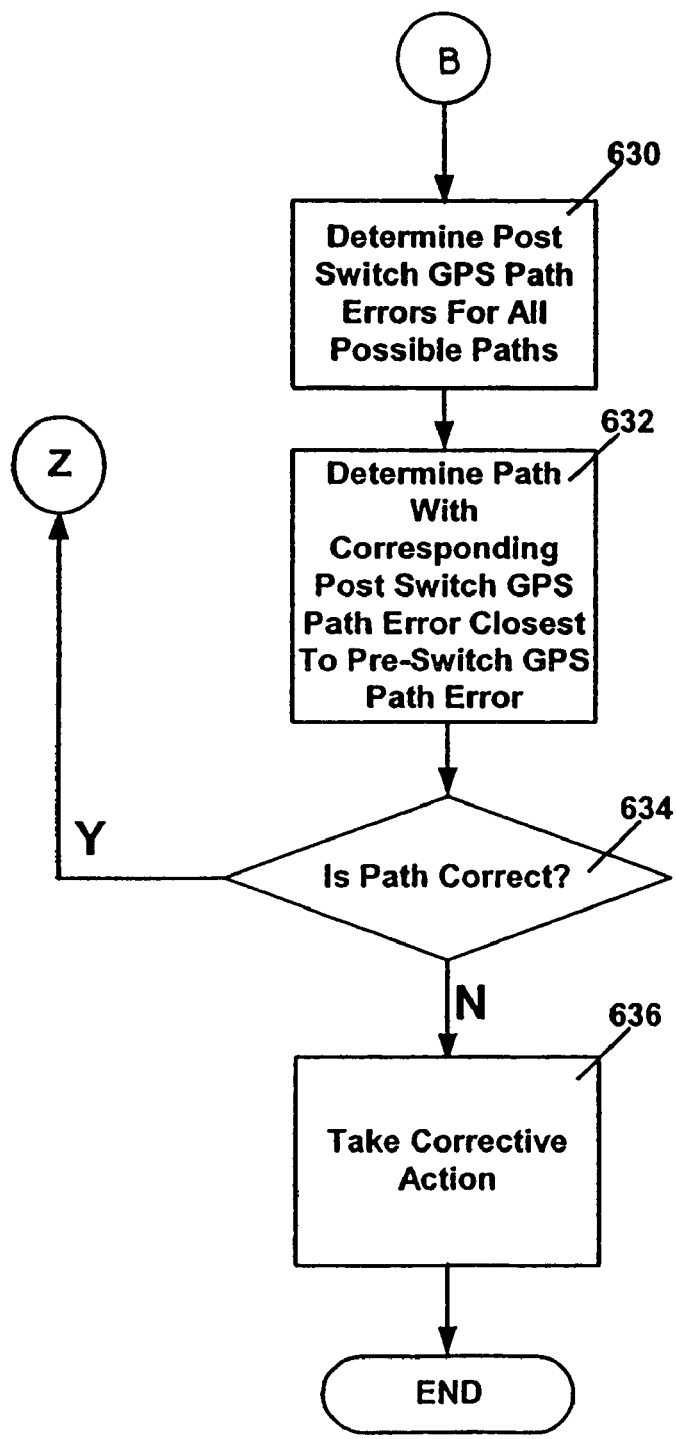

FIG. 6c represents an alternative to the processing of FIG. 6b. In the method of FIG. 6c, after completion of step 616 (FIG. 6a), the controller 110 determines the post-switch GPS path errors for all possible paths at step 630. The controller 110 then determines which of the post-switch GPS path errors are closest to the pre-switch GPS path error at step 632. The path corresponding to this closest post-switch GPS path error is the path that the vehicle has taken. If this path is the correct path at step 634, steps 602 et seq. (FIG. 6a) are repeated. If the path with the corresponding post-switch GPS path error closest to the pre-switch GPS path error is not the correct path at step 634, corrective action (such as that discussed in connection with step 626) is taken at step 636.

Figure 6D:
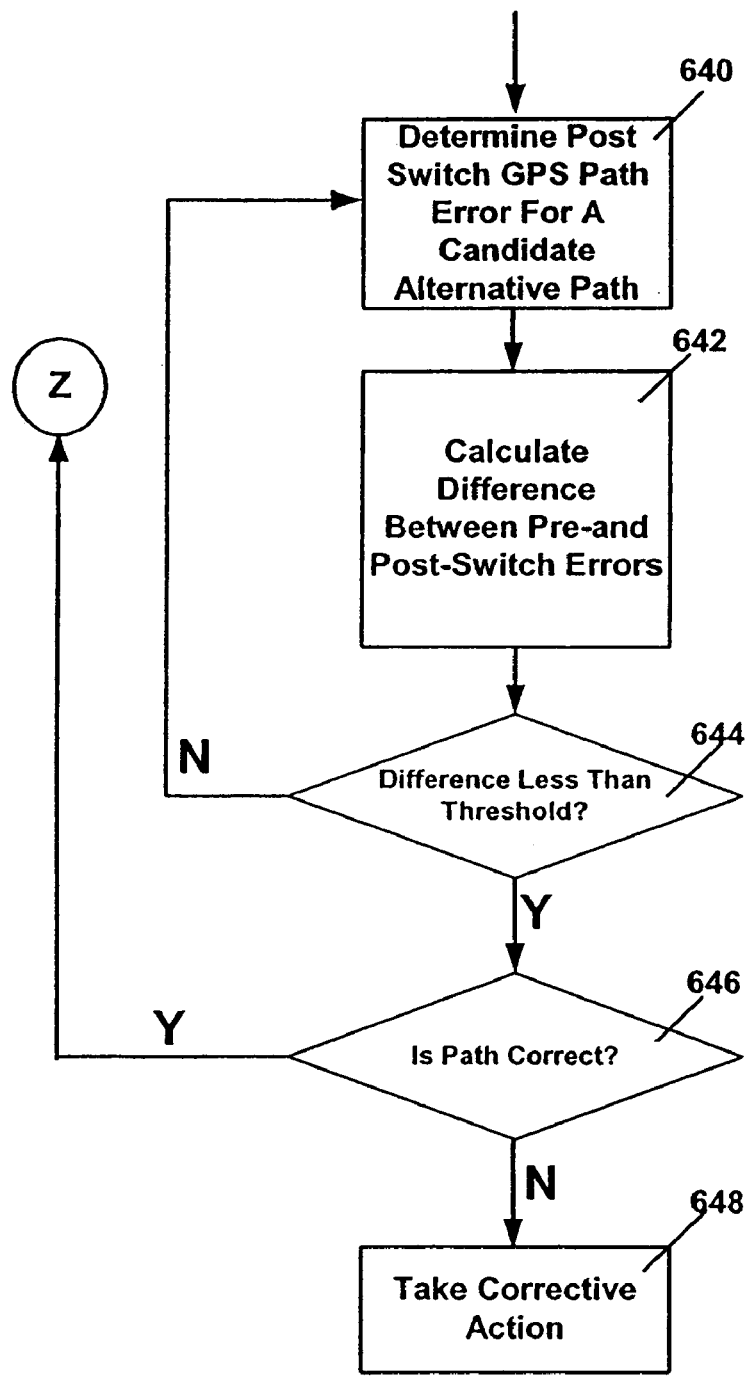

FIG. 6d represents another alternative to the processing of FIGS. 6b and 6c. In the method of FIG. 6d, after completion of step 616 (FIG. 6a), the controller 110 determines the post-switch GPS path error for a candidate alternative path at step 640. The first time this step is executed, all of the alternative paths will be candidate alternative paths. As each candidate alternative path is tested and discarded in the manner discussed below, it is deleted from the pool of candidate alternative paths. The candidate alternative paths may be tested in any order. The difference between the post-switch GPS path error for the candidate alternative path and the pre-switch GPS path error is calculated at step 642. This difference is compared to a threshold at step 644. If the difference is less than the threshold at step 646, controller 110 assumes that the train is on the path corresponding to this post-switch GPS path error. The controller 110 then determines whether this is the correct path by comparing it to the stored route information at step 646. If it is, steps 602 et seq. (FIG. 6*a*) are repeated. If the path is not correct at step 646, corrective action (such as that discussed in connection with step 626) is taken at step 648.

The embodiments described above have discussed the calculation of vectors from a point reported by a GPS receiver to a point corresponding to a track location. It will be readily apparent to those of skill in the art that the vectors could be calculated in the opposite direction, i.e., from a point corresponding to a track location to the position reported by the GPS receiver. Therefore, the terms "calculating a vector between" and "determining a vector between" points A and B should be understood to include a vector from point A to point B as well as a vector from point B to point A.

While various embodiments of the present invention have been described above, it should be understood that they have been presented by way of example and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method for determining which alternative path a vehicle has taken comprising the steps of:
    determining, prior to encountering a divergence point on a fixed path, a first vector between a first point on a fixed path and a vehicle position reported by a positioning system, the divergence point being a point at which the fixed path diverges into a plurality of branches;
    determining, after the vehicle has passed the divergence point, a second vector between a vehicle position reported by the positioning system and a second point, the second point being a point on one of the branches; and
    determining which of the branches the vehicle is on based at least in part on a comparison of the first vector and the second vector.

2. The method of claim 1, wherein the first point is a point on the fixed path that is closest to the vehicle position reported by the positioning system.

3. The method of claim 1, wherein the second point is a point on one of the branches that is closest to the vehicle position reported by the positioning system.

4. The method of claim 1, wherein the positioning system is a global positioning system.

5. The method of claim 1, wherein a second vector is determined for each of the branches, and the determination of which of the branches the vehicle is on is made by selecting a branch with a second vector closest to the first vector.

6. The method of claim 1, wherein the step of determining which of the branches the vehicle is on is performed by calculating a difference between the first vector and the second vector, comparing the difference to a threshold, and selecting the branch corresponding to the second vector if the difference is below the threshold.

7. The method of claim 1, wherein the vehicle is a train, the fixed path is a train track, and the divergence point is a switch.

8. The method of claim 1, wherein the vehicle is a motor vehicle and the fixed path is a road.

9. A system for controlling a train, the system comprising:
    a controller;
    a track database in communication with the controller, the track database comprising coordinates corresponding to a plurality of points on a train track and at least one switch; and
    a global positioning system (GPS) receiver in communication with the controller and located on the train;
    wherein the controller is configured to perform the steps of
        determining a first vector between a first point on the track and a position of the train reported by the GPS receiver prior to passing the switch;
        determining a second vector between a position of the train reported by the GPS receiver after passing the switch and a second point, the second point being a point on the track past the switch; and
        determining whether the switch was in a correct position based ate least in part on a comparison of the first vector and the second vector.

10. The system of claim 9, wherein the first point is a point on the track that is closest to the vehicle position reported by the GPS receiver prior to passing the switch.

11. The system of claim 9, wherein the second point is at an intersection of a first line formed between a point in the track database that the train has most recently passed on its current trip, and a point in the track database which is the next point the train will pass on its current trip, and a second line, the second line being normal to the first line and passing through the position of the train reported by the GPS receiver that was used to calculate the second distance.

12. The system of claim 9, wherein the second point is a point on the track that is closest to the train position reported by the GPS receiver after passing the switch.

13. The system of claim 9, wherein the controller is further configured to perform the step of taking corrective action if the switch was not in the correct position.

14. The system of claim 13, further comprising a brake interface connected to the controller, the brake interface being operable to activate a brake of the train, wherein the corrective action comprises activating the brake.

15. The system of claim 13, further comprising a warning device connected to the controller, wherein the corrective action comprises activating the warning device.

16. A method for controlling a train comprising the steps of:
    determining a first vector between a first point on a track and a position of the train reported by a GPS receiver prior to passing a switch;
    determining a second vector between a position of the train reported by the GPS receiver after the train has passed the switch and a second point, the second point being a point on the track past the switch; and
    determining whether the switch was in a correct position based at least in part on a comparison of the first vector and the second vector.

17. The method of claim 16, wherein the first point is a point on the track that is closest to the vehicle position reported by the GPS received prior to passing the switch.

18. The method of claim 16, wherein the second point is at an intersection of a first line formed between a point in a track database that the train has most recently passed on its current trip and a point in the track database which is the next point the train will pass on its current trip and a second line, the second line being normal to the first line and passing through the position of the train reported by the GPS receiver that was used to calculate the second vector.

19. The method of claim 16, wherein the second point is a point on the track that is closest to the train position reported by the GPS receiver after the train has passed the switch.

20. The method of claim 16, further comprising the step of taking corrective action if the switch was not in the correct position.

21. The method of claim 20, wherein the corrective action comprises activating a train brake.

22. The method of claim 21, wherein the corrective action comprises activating a warning device.

* * * * *